: 3,340,332
DIALKYLDITHIOPHOSPHORIC ACID ESTERS
Alexis A. Oswald, Westfield, and Karl Griesbaum, Elizabeth, N.J., assignors to Esso Research and Engineering Company, a corporation of Delaware
No Drawing. Filed Sept. 30, 1963, Ser. No. 312,302
11 Claims. (Cl. 260—956)

This invention is concerned with novel organophosphorous compounds and a process for preparing such compounds. More particularly, this invention relates to the preparation of novel phosphorodithioic acid esters by the reaction of O,O'-dialkyldithiophosphoric acids with certain polyolefinic compounds and to the products of this process.

The reaction between O,O'-dialkyldithiophosphoric acid and a variety of unsaturated organic compounds is known to produce mono- and di-adducts of the acid, some of which possess properties which make them suitable as lubricating oil additives and as agricultural chemicals such as pesticides, fungicides and insecticides. The importance of selected members of this group has stimulated interest in other organophosphorus compounds which may posses comparable properties and in methods for producing these compounds.

It is an object of this invention to provide novel dialkyldithioic acid esters.

Another object of this invention is to provide a method for selectively producing certain isomers of the novel dialkyldithioic acid esters.

Yet another object of this invention is to provide novel oil additive and agricultural compositions.

It has now been discovered that O,O'-dialkyldithiophosphoric acids may be selectively added to conjugated diolefins by a free radical mechanism to yield novel compounds which exhibit excellent properties as oil additives and pesticides. In another embodiment it has been found that dialkyldithiophosphoric acids may be selectively added to a cumulative diolefin, allene, by a free radical mechanism which yields novel compounds exhibiting excellent pesticidal activity.

This novel compounds of this invention are prepared by reacting an acid having the structure:

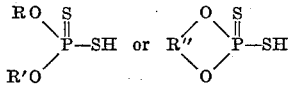

where R and R' represent any hydrocarbon radical, for example, alkyl, alkenyl, aryl or alicyclic radicals, and R" is a bivalent hydrocarbon radical with the selected diolefin. Particularly preferred compounds of this invention are prepared from acids where R, R' and R" are lower alkyl groups, especially $C_1$ to $C_{10}$ alkyl groups such as methyl ethyl and propyl groups although the reaction may be carried out utilizing R, R' and R" groups in the $C_1$ to $C_{30}$ range.

In one embodiment the above-identified acid is reacted with a conjugated diolefin to produce esters containing internal olefinic unsaturation. The conjugated diolefins employed in this invention may be $C_4$ to $C_{30}$, preferably $C_4$ to $C_{10}$, alkyls and cycloalkyls. Particularly preferred reactants are 1,3-butadiene, isoprene, piperylene, chloroprene, 1,3-hexadiene and alkyl substituted derivatives of the aforementioned compounds, such as 2,3-dimethyl-1,3-butadiene. It is a surprising feature of this invention that under the conditions employed in this reaction the reaction product of the dialkyldithiophosphoric acid and conjugated diolefin consists predominantly of a single isomer of the mono-addition product rather than a smear of products including di-adducts as might be expected when reacting a compound having more than one double bond, especially when the double, bonds are conjugated. This, for example, the mono-adducts of butadiene and 2,3-dimethyl-1,3-butadiene result in a better than 90% yield of the 1,4-addition product. In some instances such as in the reaction of 2,5-dimethyl-2,4-hexadiene the mono-adduct obtained consists predominantly of the 1,2-addition product. While not wishing to be bound by any particular theory, it is believed that the structure of the allylic radical intermediates of these conjugated diolefin reactions have an important bearing on the course of the addition reaction.

The above-described reaction between a conjugated diolefin of the type specified and the dialkyldithiophosphoric acid is carried out at a temperature in the range of $-80°$ to $+100°$ C., preferably $0°$ to $50°$ C. While the reaction may be carried out in the absence of any catalyst, it is desirable to employ a catalyst. The catalysts employable in the novel reaction of this invention are free-radical type initiators and include ultraviolet light and γ-irradiation a wide variety of peroxidic and azo compounds. Typical chemical initiators are cumene hydroperoxide, t-butyl hydroperoxide, bis-t-butyl peroxide, and bis-azo-i-butyronitrile. The dialkyldithiophosphoric acid and conjugated diolefin reactants need not be purified in any special manner to obtain the reaction products of this invention although it is preferable to subject the acid to a distillation in vacuo prior to the reaction. In the preferred method of carrying out the reaction, equimolar amounts of the starting materials are employed. It is possible, however, to use a 10% to 200% excess of either reactant and achieve similar results.

In another embodiment of this invention, it has now been discovered that a reaction between the dialkyldithiophosphoric acid described previously in this specification and a cumulative diolefin, allene, under carefully controlled reaction conditions results in the selective production of the 1,2-mono-adduct of allene in accordance with the following equation:

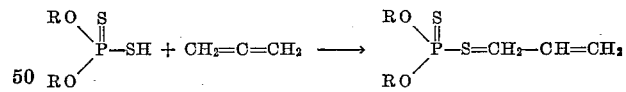

Since the above-described reactants are capable of producing other mono-adducts as well as di-adducts of allene, it is indeed surprising that reaction can be controlled to give a yield of 75% or greater of the allyl dialkyldithiophosphate mono-adduct.

While the reaction temperature for the cumulative diene reaction is similar to that described with respect to the conjugated diolefin reactions, the use of a free radical type catalyst is essential to the production of high yields of the 1,2-mono-adduct of allene. The free radical type catalysts employed are the same as those previously described in this specification. In addition, the ratio of reactants is a critical feature in the production of the 1,2-mono-adduct of allene. It is essential that an excess of allene be employed to achieve the selective reaction described above. The molar ratio of allene to acid is preferably maintained in the range of 2:1 to 5:1.

The invention will be further understood by reference to the following illustrative examples.

EXAMPLE 1

0.25 mole of O,O'-diethyldithiophosphoric acid was mixed with 0.25 mole of 1,3-butadiene in a closed 100 ml. round bottom flask equipped with a magnetic stirrer. The reaction temperature was maintained at room temperature (approximately 25° C.) for a period of eight hours and the reaction was catalyzed with ultraviolet light. Analysis of the product by gas chromatography and nuclear magnetic resonance spectroscopy indicate that 94 wt. percent of the reaction product was O,O'-diethyl-S-2-buten-1-yl dithiophosphate which may be represented structurally by the following formula:

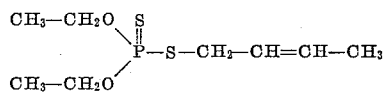

The product could be readily purified by fractional distillation in vacuo. It distilled over as a colorless liquid between 75–76° C. at 1 mm. pressure.

Analysis.—Calcd. for $C_8H_{17}O_2PS_2$: C, 39.99; H, 7.13; P, 12.88; S, 26.69. Found: C, 40.08; H, 7.37; P, 12.52; S, 27.32.

EXAMPLE 2

An experiment similar to Example 1 was carried out employing 2,3-dimethylbutadiene rather than butadiene. After reaction for a period of 24 hours for reaction product was analyzed and was found to contain 94 wt. percent of the 1,4 adduct O,O-diethyl-S-(2,3-dimethyl)-buten-1-yl dithiophosphate. On fractionation in vacuo this adduct distilled at 127–128° C. at 2 mm. pressure.

EXAMPLE 3

A reaction similar to that described in Example 1 was carried out employing isoprene as the diene reactant. After reaction for a period of 24 hours the reaction product was analyzed and found to contain 82 wt. percent of the 1,4 adduct O,O'-diethyl-S-(3-methyl)-buten-1-yl dithiophosphate, distilling between 100–105° C. at 0.5 mm.

EXAMPLE 4

A reaction similar to Example 1 was carried out utilizing 2,5-dimethyl-2,4-hexadiene as the diene reaction. After a reaction period of 72 hours the reaction product was analyzed and consisted of 85 wt. percent of the 1,2 mono-adduct O,O' - diethyl - S-2-(2,5-dimethyl-4-hexen)-yl dithiophosphate, which could be distilled at 128–130° C. under 1 mm. pressure.

EXAMPLE 5

In an experiment similar to Example 1, diisopropyldithiophosphoric acid was added to 1,3-butadiene. After a reaction period of 3 hours the reaction product was analyzed and consisted of 86% of the 1,4-adduct O,O'-diisopropyl-S-2-buten-1-yl dithiophosphate.

The product could be readily purified by fractional distillation in vacuo. It distilled over as a colorless liquid between 87–89° C. at 0.25 mm. pressure.

Analysis.—Calcd. for $C_{10}H_{21}O_2PS_2$: C, 44.75; H, 7.88; S, 23.89; P, 11.54. Found: C, 45.04; H, 7.43; S, 25.80; P, 10.71.

EXAMPLE 6

A mixture of 18.6 g. (0.1 mole) of diethyldithiophosphoric acid and 12 g. (0.3 mole) of allene were placed in a quartz pressure tube and reacted at 17° C. for a period of 24 hours under stirring and in the presence of ultraviolet light. The excess of unreacted allene was recovered by discharging it into a cooled trap. Fractional distillation of the raw product at 1 mm. pressure yielded 18.1 g. (80 wt. percent based on the acid) of the diethylallyldithiophosphate as a colorless liquid boiling between 70–72° C. Nuclear magnetic resonance and infrared absorption spectra of the product proved the assumed structure. The elemental composition of the distillate was also in agreement with expected result.

Analysis.—Calcd. for $C_7H_{15}O_2PS_2$: C, 37.15; H, 6.68; O, 14.14; P, 13.69. Found: C, 37.16; H, 6.51; O, 14.42; P, 13.52.

EXAMPLE 7

Dialkyldithiophosphoric acid adducts of conjugated dienes and allene were tested for insecticidal, miticidal and nematocidal activity. For the insecticidal and miticidal tests, the sample (0.1 g.) was dissolved in benzene or acetone (0.5 ml.) and the resulting solution was emulsified in water with Triton X–100. The nematocidal samples were formulated as 10% dusts for mixtures with soil. Test methods are described below.

*Insecticidal tests*

*Housefly tests.*—Fifty adults of the CSMA (Chemical Specialties Manufacturers' Association) strain were sprayed in a 2" x 5" diameter stainless steel cage faced on top and bottom with 14 mesh screen. Flies were retained in the cage in which they are sprayed for knockdown observations and 24-hour mortality determinations. Mortality which results from this test may be from residual contact as well as by direct contact spray. DDT at 0.05% concentration was used as the positive standard.

*Southern armyworm and Mexican bean beetle tests.*—Lima bean leaves sprayed on the dorsal and ventral surfaces were offered to ten larvae of the southern armyworm (late third instar) and of the Mexican bean beetle (late second instar) for a forty-eight hour feeding period. The feeding rate and mortality data were recorded as well as foliage injury, if any. The positive standards were 0.05% DDT and 0.1% methoxychlor, respectively.

*Pea aphid tests.*—Adult pea aphids were sprayed and transferred to sprayed pea plants and held for forty-eight hour mortality determinations. Foliage injury, if any, was recorded. DDT at 0.05% concentration was used as the positive standard.

Systemic insecticidal activity was evaluated by applying 20 ml. spray of the sample to the vermiculite substratum of potted pea plants. Forty-eight hours after application the plants were infested with ten adult pea aphids and mortality determination was made after five days. Demeton at 0.01% concentration was used as the positive standard.

*Miticidal tests*

*Spider mite tests.*—Lima bean plants were infested with fifty to one hundred adults of the strawberry spider mite, *Tetranychus atlanticus*, prior to testing. The infested plants were dipped into the test material and held for five days. Adult mortality as well as ovicidal action was noted. Aramite and ovotran were used as positive standards at 0.1% concentration.

*Nematocidal tests*

*Meloidogyne sp.* nematodes were reared in tomato plant-soil medium. Soil for test purposes was inoculated with infected soil and root knots from infected tomato plants. The samples were blended thoroughly with the soil in a V-shell blender. Four one-pint paper pots were used for each treatment with one tomato transplant per pot. After three to four weeks under artificial light and overhead irrigation, the roots of the plants were examined for degree of root knot formation. Inoculated controls normally have about 50–100 root knots per plant. Percent control is determined by a comparison of the knot counts on treated and untreated tomato plants.

A summary of the test results is given in Table I below. These test results clearly indicate that the conjugated diene and allene adducts are excellent pesticides in a wide variety of applications.

TABLE I

| Dialkyldithiophosphoric Acid-Diene Adduct | | | Concentration of Insecticide and Miticide, Percent, Wt./Vol. | Mortality of Insects and Mites After Test, Percent | | | | | | | Control of Nematocides by 100 lbs. per 4 in. acre, Percent |
|---|---|---|---|---|---|---|---|---|---|---|---|
| From— | | Structure | | House Flies | | Southern Army Worms, 48 hrs. | Mexican Bean Beetles, 48 hrs. | Pea Aphids | | Spider Mites, 5 days | |
| Dithiophosphoric Acid | Diene | | | 2 hrs. | 24 hrs. | | | Contact, 48 hrs. | Systemic, 5 days | | |
| | Conjugated: | | | | | | | | | | |
| Dimethyl | Butadiene | (MeO)₂P(S)SCH₂—CH=CH—CH₃ | 0.05 | 0 | 0 | 0 | 0 | 100 | 100 | 61 | |
| Diethyl | ___do___ | (EtO)₂P(S)SCH₂—CH=CH—CH₃ | 0.05 | 0 | 4 | 0 | 80 | 90 | 90 | 92 | 90 |
| Do | Isoprene | (EtO)₂P(S)SCH₂—CMe=CH—CH₃ | 0.20 | 30 | 90 | 0 | 90 | 100 | 80 | 56 | 0 |
| Do | ___do___ | (EtO)₂P(S)SCH₂—CMe=CH—CH₃ | 0.05 | 0 | 0 | | 10 | 70 | 70 | | |
| | Cumulative: | | | | | | | | | | |
| Dimethyl | Allene | (MeO)₂P(S)SCH₂CH=CH₂ | 0.2 | | | | | 0 | 100 | 0 | 100 |
| Diethyl | ___do___ | (EtO)₂P(S)SCH₂CH=CH₂ | 0.2 | | | | | 50 | 60 | 59 | 30 |

EXAMPLE 8

An adduct of diisopropyl dithiophosphoric acid and 1,3-butadiene (O,O'-diisopropyl-S-2-buten-1-yl dithiophosphate) was tested for activity as a lubricating oil additive and compared with other dialkyldithiophosphoric acid adducts including a zinc salt of a mixture of isobutyl and n-amyl dithiophosphoric acid. In each instance the composition was prepared by mixing a small amount of the additive (0.1 wt. percent based on phosphorus) with a major portion of a mineral lubricating oil. The mineral lubricating oil employed in the tests was S.A.E. 30 Grade 100 V.I. oil.

In the Oxidation Stability Test the oil was aerated at 270° C. (34±1° F.) for 23 hours in the presence of silver and copper-lead specimens attached to a shaft spun at a rate of 600 r.p.m. The extent of oxidation was measured by the increase of the viscosity of the oil. The corrosivity of the oxidized oil appears as a weight change in the metallic specimens. After 3 and 19 hours these specimens were replaced by new ones; consequently, the weight losses refer to the three intermediate periods between the start of the experiment and 23 hours.

The data shown in Table II indicate that the diisopropyldithiophosphoric acid mono-adduct of butadiene has antioxidant activities comparable to the activity of the zinc dialkyldithiophosphate.

The 4-Ball Wear Test [H. L. West, J. Inst. Petr. 32, 210, 222 (1964)] was used for the characterization of hydrodynamic lubrication of steel surfaces by the oil. In the test, three steel balls were placed in a fixed triangular position and a fourth was mounted above them. The fourth ball was mounted in a chuck so that the assembly could be rotated under pressure while lubricated with the oil to be tested. The tests were carried out at a rotational speed of 1800 r.p.m. under 10 kg. pressure at 150° C. for 30 minutes. Then the balls were microscopically examined for scar diameters which are, of course, directly proportional to the wear.

The results of Table II show that the diisopropyldithiophosphoric acid-butadiene adduct is only slightly inferior to the zinc dialkyldithiophosphate.

In the Regular Extreme Pressure Test, "Load Bearing Capacity SAE," Federal Test Method 6501.02 (15.15.1955), two lubricated metallic surfaces were turned over each other at a rate of 1000 r.p.m. with 3.4/1 rubbing ratio under increasing pressure until seizure occurred.

The data of Table II show that the dialkyldithiophosphoric acid adduct of butadiene is superior in this test to zinc dialkyldithiophosphate.

TABLE II.—ESSO RESEARCH AND ENGINEERING LUB STABILITY TEST

| Additive Components | | Additive Concentration, percent P | Kinematic Viscosity, Saybolt, sec. | | | Weight Loss of Silver, Mg. | | | Weight Loss of Cu/Pb Bearing, Mg. | | | 4-Ball Wear Test, Scar Diameter, microns | Pressure Test, Max. Pres., lbs. |
|---|---|---|---|---|---|---|---|---|---|---|---|---|---|
| Diene | Dithiophosphoric Acid | | Initial | 19 hrs. | 23 hrs. | 3 hrs. | 19 hrs. | 23 hrs. | 3 hrs. | 19 hrs. | 23 hrs. | | |
| Base Oil | | Nil | 148 | 305 | 381 | −1 | −1 | −2 | +1 | −285 | −309 | 0.407 | 1,100 |
| Zinc Dialkyldithiophosphate | | 0.1 | 149 | 159 | 161 | −4 | −187 | −1 | 0 | +5 | −16 | 0.266 | 1,600 |
| Butadiene | Diisopropyl | 0.1 | 149 | 160 | 165 | +11 | −23 | 0 | +9 | +20 | −69 | 0.313 | 2,000 |

The pesticidal compositions of this invention may be employed in either solid or liquid form. When used in solid form they may be reduced to an impapable powder and applied as an undiluted dust or mixed with a solid carrier such as clay, talc and bentonite as well as other carriers known in the art. The pesticidal compositions may also be applied as a spray in a liquid carrier either as a solution in a solvent or as a suspension in a non-solvent such as water. Typical solvents are organic compounds such as acetone, ethyl alcohol, benzene, naphtha, etc. although different compounds exhibit different solubilities for the novel compositions. Suitable wetting agents include the sulfates of long chain alcohols such as dodecanol and octadecanol, sulfonated amide and ester derivatives, sulfonated aromatic and mixed alkylaryl derivatives, esters of fatty acids such as the recinoleic ester of sorbitol and petroleum sulfonates of $C_{10}$ to $C_{20}$ length nonionic emulsfying agents such as the ethylene oxide condensation products of alkylated phenols may also be employed with the novel compositions of this invention. The compounds of this invention may also be admixed with carriers that are themselves pesticides.

Having thus described the general nature and specific embodiments of the invention, the true scope will be pointed out by the appended claims.

What is claimed is:

1. A composition of matter having the following structure:

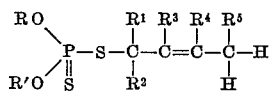

wherein R and R' are selected from the group consisting of $C_1$-$C_{30}$ alkyl, $C_1$-$C_{30}$ alkenyl, and $C_6$-$C_{14}$ aryl; and $R^1$-$R^5$ are selected from the group consisting of hydrogen, $C_1$-$C_6$ alkyl and chlorine.

2. A composition of matter represented by the following formula:

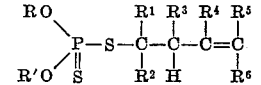

wherein R and R' are selected from the group consisting of $C_1$–$C_{30}$ alkyl, $C_1$–$C_{30}$ alkenyl and $C_6$–$C_{14}$ aryl; $R^1$–$R^4$ are selected from the group consisting of hydrogen, $C_1$–$C_6$ alkyl and chlorine; $R^5$ and $R^6$ are $C_1$–$C_6$ alkyl groups.

3. O,O'-diethyl-S-2-buten-1-yl dithiophosphate.
4. O,O'-dimethyl-S-2-butene-1-yl dithiophosphate.
5. O,O'-diisopropyl-S-2-butene-1-yl dithiophosphate.
6. O.O'-diethyl-S - 2 - (2-methyl)-buten-1-yl dithiophosphate.
7. O,O'-diethyl-S-2(2,5-dimethyl-4 - hexen)-yl dithiophosphate.
8. A process for preparing a dialkyldithiophosphate which comprises reacting equimolar amounts of an acid having the structure

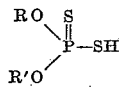

wherein R and R' are hydrocarbon radicals containing 1 to 30 carbon atoms with a conjugated diolefin containing 4 to 30 carbon atoms at a temperature in the range of $-80°$ to $+100°$ C.

9. The process of claim 8 wherein said reaction is carried out in the presence of a free radical type initiator.
10. The process of claim 8 wherein said temperature is maintained between 0° to 50° C.
11. A process for preparing an allyl dialkyldithiophosphate which comprises reacting an acid having the structure

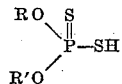

wherein R and R' are hydrocarbon radicals containing 1 to 10 carbon atoms with allene, the molar ratio of said allene to acid being in the range of 2:1 to 5:1, said reaction being carried out at a temperature in the range of $-80°$ to $+100°$ C. in the presence of a free radical type initiator.

References Cited

UNITED STATES PATENTS

| | | | |
|---|---|---|---|
| 2,976,308 | 3/1961 | Bacon | 260—978 |
| 3,153,664 | 10/1964 | Schicke et al. | 260—956 X |
| 3,159,664 | 12/1964 | Bartlett | 260—937 |

FOREIGN PATENTS 209,104  7/1955  Australia.

CHARLES B. PARKER, *Primary Examiner.*

FRANK M. SIKORA, RICHARD L. RAYMOND, *Assistant Examiners.*